United States Patent [19]

Kawaguchi et al.

[11] Patent Number: 4,753,760
[45] Date of Patent: Jun. 28, 1988

[54] PROCESS FOR PREPARING IMPROVED PELLETS OF HYDROLYZED ETHYLENE-VINYL ACETATE COPOLYMER

[75] Inventors: Hiroshi Kawaguchi, Kurashiki; Hiroshi Takida, Takatsuki; Atsushi Kanai, Nara, all of Japan

[73] Assignee: Nippon Gohsei Kagaku Kogyo Kabushiki Kaisha, Osaka, Japan

[21] Appl. No.: 927,136

[22] Filed: Nov. 5, 1986

[30] Foreign Application Priority Data

Nov. 5, 1985 [JP] Japan .................. 60-247714

[51] Int. Cl.⁴ .................. B29B 9/06; B29B 9/12
[52] U.S. Cl. .................. 264/28; 264/130; 264/143; 264/185; 264/233; 264/300; 264/343; 264/344
[58] Field of Search .............. 264/130, 143, 141, 185, 264/300, 233, 28, 343, 344

[56] References Cited

U.S. PATENT DOCUMENTS

| | | | |
|---|---|---|---|
| 2,128,534 | 8/1938 | Howald | 264/130 |
| 2,338,787 | 1/1944 | Ushakoff | 264/300 |
| 3,066,999 | 12/1962 | Nakajo et al. | 264/300 |
| 4,164,529 | 8/1979 | Fujita et al. | 264/185 |
| 4,240,993 | 12/1980 | Sun | 264/185 |
| 4,320,041 | 3/1982 | Abe et al. | 264/185 |
| 4,547,329 | 10/1985 | Dombroski et al. | 264/141 |

FOREIGN PATENT DOCUMENTS 54-149753  11/1979  Japan .

Primary Examiner—Jeffery Thurlow
Attorney, Agent, or Firm—Antonelli, Terry & Wands

[57] ABSTRACT

A process for preparing improved pellets of a hydrolyzed ethylene-vinyl acetate copolymer which comprises extruding a methanol or a water-methanol solution including a hydrolyzed ethylene-vinyl acetate copolymer and a lubricant into a coagulating liquid in the form of a strand and cutting the strand into pellets. According to the process of the present invention, the molding processability can be improved without damaging the properties of the molded articles.

13 Claims, 1 Drawing Sheet

PROCESS FOR PREPARING IMPROVED PELLETS OF HYDROLYZED ETHYLENE-VINYL ACETATE COPOLYMER

BACKGROUND OF THE INVENTION

The present invention relates to a process for preparing pellets of hydrolyzed ethylene-vinyl acetate copolymers, and more particularly to a process for preparing pellets of hydrolyzed ethylene-vinyl acetate copolymers having an improved melt-moldability and capable of giving films having improved physical properties.

Hydrolyzed ethylene-vinyl acetate copolymers are widely employed for various uses such as films, sheets, containers and fibers since the hydrolyzed copolymers are excellent in properties such as oxygen-barrier property and mechanical strength. In these uses, hydrolyzed ethylene-vinyl acetate copolymers are melt-molded. In the melt-molding, the flow of the hydrolyzed copolymers is bad in a portion contacting a wall of a mold since hydrolyzed copolymers have a large adhesion to metals in the melted state. When the melt-molding is continued for a long time, it is impossible to operate stably or to increase the productivity by increasing extrusion rate since the screw torque increases. Accordingly, when the hydrolyzed copolymers are melt-molded for a long time, generally, copolymers are blended with lubricants in a small amount.

When molded articles such as sheets or films are prepared by melt-molding, hydrolyzed ethylene-vinyl acetate copolymers must be formed into pellets from the point of handling or molding processability, and it is general that the hydrolyzed copolymers are dry-blended with the lubricants and the mixtures are supplied to an extruder to form into pellets.

However, the addition of lubricants is never preferable from the point of properties of molded articles such as films. For instance, bleeding of lubricant occurs due to the lack of compatibility between hydrolyzed ethylene-vinyl acetate copolymers and lubricants. As a result, the adhesive strength to other materials decreases in the case of laminating or coating the hydrolyzed copolymers on the materials, or fish eyes are formed on the surface of the molded articles such as films and sheets.

Accordingly, in the conventional method, it is substantially impossible that the molding processability is improved without damaging properties of the molded articles.

An object of the present invention is to provide a process for preparing pellets of hydrolyzed ethylene vinyl acetate copolymers having an improved molding processability.

An another object of the present invention is to provide a process for preparing pellets of hydrolyzed ethylene-vinyl acetate copolymers capable of giving molded articles having improved properties.

These and other objects of the present invention will become apparent from the description hereinafter.

SUMMARY OF THE INVENTION

In accordance with the present invention, there is povided a process for preparing improved pellets of a hydrolyzed ethylene-vinyl acetate copolymer which comprise extruding a methanol or water-methanol solution including a hydrolyzed ethylene-vinyl acetate copolymer and a lubricant into a coagulating liquid in the form of a strand and cutting the strand into pellets.

DETAILED DESCRIPTION

Figure 1:
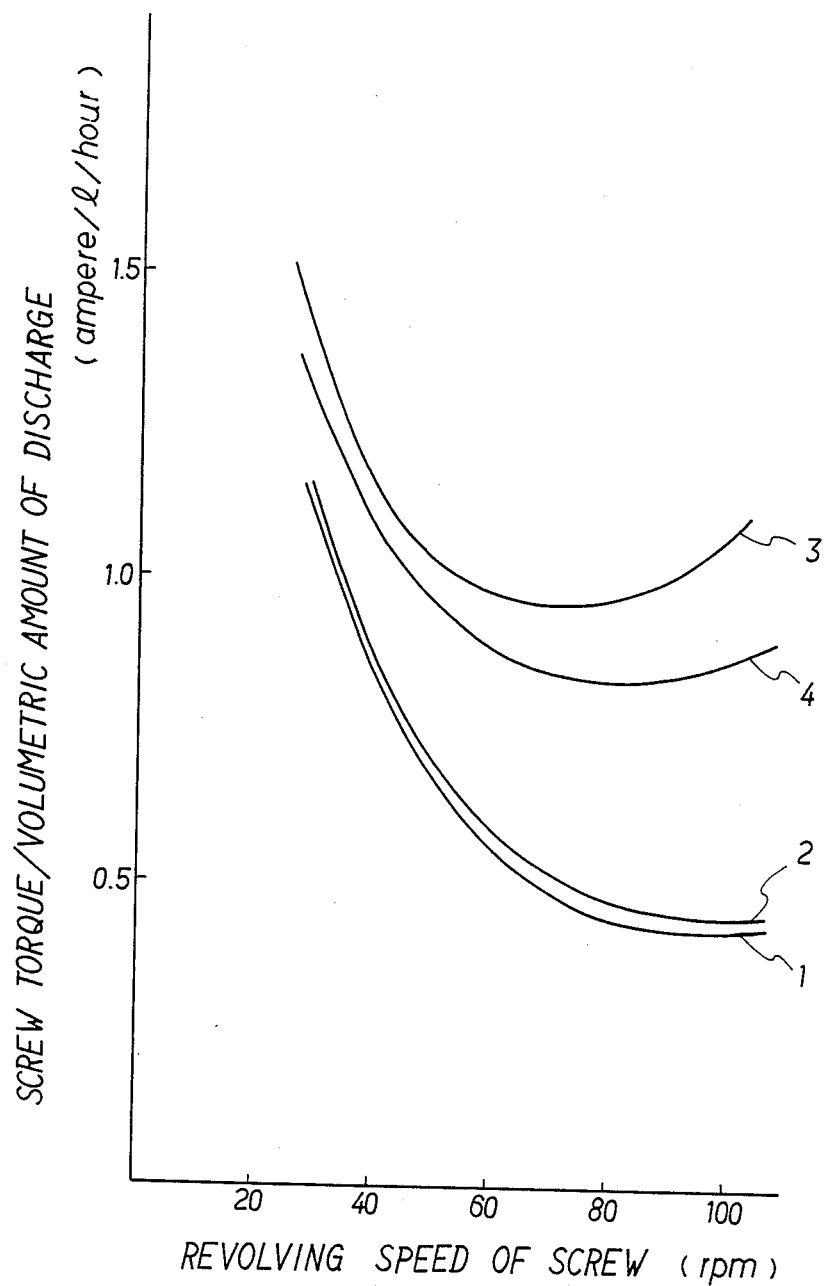
FIG. 1 is a graph showing relationships between the revolving speed of screw (rpm) and the ratio of the screw torque (ampere) to the volumetric amount of discharge (liter/hour), wherein the curves (1) and (2) show the results of Examples 1 and 2, the curve (3) shows the result of Comparative Example 1 and the curve (4) shows the result of Comparative Example 2.

In the present invention, there are used hydrolyzed ethylene-vinyl acetate copolymers having an ethylene content of 20 to 60% by mole, preferably from 25 to 55% by mole, and having a degree of hydrolysis in the vinyl acetate component of not less than 90% by mole, preferably not less than 95% by mole. When the ethylene content is less than 20% by mole, the oxygen-barrier property of the polymer in high humidity decreases. On the other hand, when the ethylene content is more than 60% by mole, physical properties such as oxygen-barrier property and printability decrease. When the degree of hydrolysis is less than 90% by mole, oxygen-barrier property and moisture resistance decrease.

The hydrolyzed copolymers may include comonomers as copolymerizable components. Examples of the comonomers are, for instance, α-olefins such as propylene, isobutene, α-octene α-dodecene and α-octadecene, unsaturated carboxylic acids, salts, partially or completely alkylated esters, nitriles, amides, anhydrides, unsaturated sulfonic acids, the salts thereof, and the like. The amount of the comonomer is from 0.1 to 10% by mole, preferably from 0.5 to 5% by mole.

The hydrolyzed copolymers are dissolved in methanol or the mixture of water and methanol, and the solutions are extruded into coagulating liquids in the form of strands. In the present invention, it is essential that the lubricants exist in the solutions of the hydrolyzed copolymers. Lubricants can be added at any times so long as the lubricants exist in the solutions of the hydrolyzed copolymers in the stages before extruding into the coagulating liquids. For instance, the lubricants are added at the time when ethylene and vinyl acetate are copolymerized, at the time when the ethylene-vinyl acetate copolymers are hydrolyzed, and the like. Among them, it is the most effective that the lubricants are added at the time when the solutions to be extruded are prepared.

The hydrolyzed copolymers are generally prepared by hydrolyzing the ethylene-vinyl acetate copolymers with alkali catalysts in methanol and neutralizing them. Accordingly, in case of using methanol as the solvent of the solutions to be extruded, the lubricants are added to the hydrolysis reaction mixtures as they are, or suitably concentrated or diluted. In case of using the mixture of water and methanol as the solvent of the solutions to be extruded, the lubricants are added at the time when water is added to the hydrolysis reaction mixtures, or water is added to the suitably concentrated or diluted hydrolysis reaction mixtures.

The concentration of the hydrolyzed ethylene-vinyl acetate copolymers in the solutions to be extruded is not particularly limited unless hydrolyzed copolymers are deposited at the temperature that the solutions have, and the concentration is generally from 10 to 50% by weight, preferably from 15 to 45% by weight. When the concentration is so low, it is hard to coagulate the solutions in the coagulating liquids, and on the other hand, when the concentration is so high, the porosity of the pellets decreases. The mixture of water and methanol is preferable as the solvent of the solutions to be extruded from the point of stability of the solutions. It is preferable that the weight ratio of water and methanol is from 1:9 to 7:3, preferably from 2:8 to 6:4. When the ratio of water to methanol is less than 1/9, the solutions are unstable and the porosity decreases in coagulating the strands and on the other hand, when the ratio is more than 7/3, the solutions to be extruded are unstable and the hydrolyzed copolymers may be deposited before extruding into the coagulating liquids.

The lubricants are added in an amount of 0.01 to 0.5 part by weight, preferably from 0.02 to 0.2 part by weight, based on 100 parts by weight of the hydrolyzed ethylene-vinyl acetate copolymers. When the amount of the lubricants is less than 0.01 part by weight, the screw torque is increased during extrusion and the amount of discharge cannot be increased, and on the other hand, when the amount is more than 0.5 part by weight, the stability of the discharge is poor and there occur troubles that properties such as printability, adhesion and laminating proparty of the molded articles are poor or fish eyes are formed.

The lubricants can be used in any forms. For instance, they are used in a powdered state, solution state, dispersion state, and the like. In order to obtain the lubricating effect in a small amount by increasing the compatibility of the lubricants with the hydrolyzed copolymers, it is preferable that the lubricants are used in the state of a dispersion, more preferably an aqueous dispersion of the lubricants.

In the present invention, any lubricants can be used. Examples of the lubricants are, for instance, saturated fatty acid amides such as stearamide, unsaturated fatty acid amides such as olefinic acid amides, bis-fatty acid amides such as ethylene bis stearamide, metal salts of fatty acid such as calcium stearate, polyolefins having low molecular weight such as polyethylene or polypropylene having molecular weight of about 500 to about 10,000, and the like, but the lubricants are not limited thereto. The lubricants may be employed alone or in admixture thereof.

As the coagulating liquids used in the present invention, there are preferable water and the mixture of methanol and water, more preferably the mixture of methanol and water having a methanol concentration of 10 to 50% by weight. It is necessary that the methanol concentration in the coagulating liquids are the same or less as in the above-mentioned mixture of water and methanol for solutions of the hydrolyzed copolymers. If the methanol concentration in the coagulating liquids is higher than the concentration of the solutions to be extruded, the loss of resin is increased during formation of strands in the coagulating liquids.

In order to exhibit remarkably the effect of the invention, as coagulating liquid, there are used organic solvents having a boiling point of not more than 100° C., and being compatible with methanol but not being capable of dissolving the hydrolyzed copolymers. By using such an organic solvent, not only the pellets having a remarkably improved porosity, that is, the pellets capable of easily removing alkali salts of acetic acid such as sodium acetate which are contained in the hydrolyzed ethylene-vinyl acetate copolymers as an impurity, can be prepared, but also troubles such as the loss of resin do not entirely occur.

Examples of the organic solvents are, for instance, aromatic hydrocarbons such as benzene, ketones such as acetone and methyl ethyl ketone, ethers such as dipropyl ether, organic acid esters such as methyl acetate, ethyl acetate and methyl propionate, and the like. Among them, methyl acetate is the most preferable.

The solutions of the hydrolyzed copolymers are extruded into the coagulating liquids at $-10°$ to 40° C., preferably from 0° to 30° C. The hydrolyzed ethylene-vinyl acetate copolymers are not dissolved in the organic solvents used as the coagulating liquids. Accordingly, the loss of resin scarcely occur due to dissolving the hydrolyzed copolymers in the coagulating liquids, but it is preferable that the extrusion is carried out at low temperature.

The solutions of the hydrolyzed ethylene-vinyl acetate copolymers are extruded through holes of a nozzle or die into the coagulating liquids in the form of strands. The form of the holes is not limited, and is generally circular. It is preferable that the diameter of the holes is from about 2 to about 5 mm. It is not necessary that the solutions of the hydrolyzed copolymers are extruded into a single strand. It is possible to extrude into the any number of strands within the range of several strands to several hundreds strands.

The solution are extruded in the form of the strand and the strands are cut into pellets after they are thoroughly coagulated. In the pelletization, the strands are cut by using a fixed blade or a rotary knife.

The strands can be pelletized in any methods such as (1) a method in which after taking out the strands from the coagulating liquids, the strands are thoroughly washed with water and then are cut, (2) a method in which after cutting the strands taken out from the coagulating liquids, the obtained pellets are washed with water, (3) a method in which after cutting the strands in the coagulating liquids, the obtained pellets are taken out from the liquids and washed with water.

The form of the pellets depends on the pelletizing methods (1) to (3), and in the methods (1) and (2), the pellets have the form of a cylinder and in the method (3), they have the form of a sphere. It is preferably that the cylindrical pellets have a diameter of about 2 to about 5 mm and a length of about 2 to about 5 mm, and the spheric pellets have a diameter of about 2 to about 5 mm, from the point of workability or handling upon molding.

The obtained pellets are subjected to any after-treatment such as an acid-treatment as occasion demands, and dried. The simplest acid-treatment is carried out as follows:

(A) The pellets are washed with water in accordance with the above mentioned (1), (2) and (3) methods and then are washed with water-containing acetic acid.

(B) The pellets are washed with water-containing acetic acid and then are washed with water. The preferable acid-treatment is carried out as follows:

The pellets are treated with (a) acids containing an acid group having a pka of not more than 5.0 at 25° C. and (b) a primary calcium or magnesium salt of a polybasic acid containing an acid group having a pka of not more than 3.4 at 25° C. (hereinafter referred to as "primary salt") under the condition that at least one of the acids(a) and the primary salts(b) has a phosphate ion.

The pka is defined as follows:

$$pka = -\log ka$$

wherein ka is a dissociation constant of acid. The acid-treatment is carried out so that the treated hydrolyzed copolymers have (1) a content of alkali metals of 0.001 to 0.025% by weight, (2) a molar ratio of alkali metals of phosphate ion of 0.1 to 5 and (3) a molar ratio of magnesium or calcium to phosphate ion of 0.3 to 1.3. By the above-mentioned acid-treatment, not only the thermal stability of the hydrolyzed ethylene-vinyl acetate copolymers is improved, thus resulting in melt-molding effectively, but also fish eyes are scarcely formed on the molded articles such as film and sheet and the repeatedly moldability (long-run property) is excellent. That is, when the hydrolyzed copolymers are subjected to the above-mentioned acid-treatment, a molded article having the high value as a commodity can be obtained.

In the acid-treatment, it is essential to use (a) the acid containing the acid group having the pka of not more than 5.0 at 25° C. and (b) the primary calcium or magnesium salt of polybasic acid containing the acid group having the pka of not more than 3.4 at 25° C., at least one of the acids (a) and the primary salts (b) having phosphate ion. When the acid (a) and the primary salt (b) are used independently, the coexistence of effects of the improvement of thermal stability and the decrease of fish eyes cannot be obtained.

Any acids can be used as the acid (a) so long as the acid contains the acid group having the pka of not more than 5.0. As the acid (a), there are preferably used acetic acid and sodium primary phosphate. When acids containing an acid group having the pka of more than 5.0 are used, the effect for preventing the thermal coloring is poor. The acid (a) may be employed alone or in admixture thereof. The combination of acetic acid and orthophosphoric acid, and acetic acid and sodium primary phosphate are the most preferable as the acid (a).

Examples of the primary salts (b) are, for instance, calcium primary phosphate, magnesium primary phosphate, calcium primary citrate, calcium primary tartrate, calcium primary malonate, calcium primary maleate, and the like. Among them, calcium primary phosphate and magnesium primary phosphate are preferably used. When the primary salt containing the acid group having the pka of more than 3.4 is used as the (b)component, the effect for preventing the thermal coloring is poor, which is industrially disadvantageous.

After carrying out the above-mentioned acid-treatment, the hydrolyzed ethylene-vinyl acetate copolymers are dried to form end products. The products of hydrolyzed ethylene-vinyl acetate copolymers must have the content of alkali metals of 0.001 to 0.025% by weight, preferably from 0.001 to 0.020% by weight, the molar ratio of alkali metals to phosphate ion of 0.1 to 5, preferably from 0.5 to 4, and the molar ratio of calcium or magnesium to phosphate ion of 0.3 to 1.3, preferably from 0.4 to 1.2. When the content of alkali metals is less than 0.001% by weight, not only fish eyes increase but also it is hard to industrially prepared the products in usual manner, and on the other hand, when the content is more than 0.025% by weight, the thermal coloring increases. When the molar ratio of alkali metals to phosphate ion is less than 0.1, fish eyes increase, and on the other hand, when the molar ratio is more than 5, the thermal stability decreases. When the molar ratio of calcium or magnesium to phosphate ion is less than 0.3, the thermal stability decreases, and on the other hand, when the molar ratio is more than 1.3, small fish eyes remarkably increase, which is not practical.

The pellets are melt-molded to give a desired molded article. According to the process of the present invention, the following effects are obtained.

(1) In the present invention, the screw torque is not very increased if the revolving speed of the screw is increased. On the other hand, when the lubricant is not added or added in a conventional method, the screw torque is increased remarkably with increasing the revolving speed of the screw. In other words, in the present invention, the productivity can be increased by increasing the amount of discharge, but in the usual manner, the increase of the amount of discharge is limited.

FIG. 1 is a graph showing relationships between the revolving speed of the screw (hereinafter referred to as "n") (rpm) and the ratio of the screw torque (hereinafter referreh to as "A") (ampere) and the volumetric amount of discharge (hereinafter referred to as "Qv") (liter/hour), wherein the curves (1) and (2) show the results of Examples 1 and 2, the curve (3) shows the result of Comparative Example 1 and the curve (4) shows the result of Comparative Example 2. When the lubricants are added to the solutions of the hydrolyzed ethylene-vinyl acetate copolymers in the mixture of water and methanol, the A/Qv ratio gradually decreases with increase of n as shown in the curves (1) and (2) of FIG. 1. When the lubricant is not added, the A/Qv ratio initially decreases with increase of n but rapidly increases when n reaches to a certain value, as shown in the curve (3) of FIG. 1. When the lubricants are dry-blended with the hydrolyzed ethylene-vinyl acetate copolymers, the A/Qv ratio turns to the increase when n reaches to a certain value, as shown in the curve (4) of FIG. 1.

(2) In the process of the present invention, the lubricants are not transferred to the surface of the molded articles, since the hydrolyzed copolymers are uniformly admixed with the lubricants and the lubricants are used in a very small amount compared with the conventional methods. Accordingly, the printability, adhesion and laminating property of the molded articles are excellent. For instance, when the hydrolyzed ethylene-vinyl acetate copolymers containing lubricants and a low density polyethylene modified with a small amount of a carboxylic acid are coextruded by blow molding to give a container, the adhesive strength between layers is larger in the case of the present invention than in the case of usual manners.

Although the hydrolyzed copolymers including no lubricant have almost the same adhesive strength as the hydrolyzed copolymers obtained by the present invention, the hydrolyzed copolymers including no lubricant cannot be molded in long time and have high A/Qv ratio, which is not practical. Moreover, the molded articles of the hydrolyzed copolymers obtained by the present invention do not have fish eyes and have very excellent value.

It is preferably that the hydrolyed copolymers are melt-molded at a temperature of about 160° to about 260° C. When the hydrolyzed copolymers are subjected to melt-molding, the copolymers may be suitably admixed with lubricants, usual reinforcement such as glass fibers and carbon fibers, and usual additives such as fillers, coloring agents, stabilizers and blowing agents as occasion demands. The pellets of hydrolyzed copolymers having lubricants, especially the pellets on which surface are covered with lubricants, can more effectively prevent the increase of the screw torque. The lubricants can be adapted on the surface of the pellets with spraying the aqueous dispersion contaning lubricants on the pellets, or with dipping the pellets into the above-mentioned aqueous dispersion. The amount of adapted lubricants is usually selected from 20 to 300 ppm. Also, the hydrolyzed copolymers may be suitably admixed with a thermoprastic resins to improve the properties.

Usual molding methods such as an injection molding, a compression molding and an extrusion molding are applicable to melt-molding the hydrolyzed copolymers obtained by the present invention. Examples of the extrusion are, for instance, T-die extrusion, blow molding, pipe extrusion, melt spinning, profile extrusion, tubular extrusion, and the like.

Also, the molded articles can be extruded from not only the hydrolyzed ethylene-vinyl ecetate copolymers alone (for instance, film, sheet, tape, bottle, pipe, filament, profile extrudate, and the like) but also the coextrusion of the hydrolyzed copolymers and other thermoplastic resins. It is one of the characteristics of the present invention that the molded articles obtained by coextrusion have the excellent adhesive strength between layers. Examples of the other resins in coextrusion, polyolefins such as low density polyethylene, middle density polyethylene, high density polyethylene, ethylene-vinyl acetate copolymer, ionomers, copolymers of ethylene and α-olefin having 3 to 20 carbon atoms, ethylene-acrylic ester copolymers, polypropylene, copolymers of propylene and α-olefin having 4 to 20 carbon atoms, polybutene and polypentene, or copolymers thereof, the above-mentioned polyolefins or copolymers graft-modified with unsaturated carboxylic acids or esters; polyesters, polyamides, copolyamide, polyvinyl chloride, polyvinylidene chloride, acrylic resins, styrene resins, vinyl ester resins, polyester elastomers, polyurethane elastomers, chlorinated polyethylene, chlorinated polypropylene, and the like. The hydrolyzed copolymers obtained by the invention can be coextruded with other hydrolyzed ethylene-vinyl acetate copolymers having the different composition from the present invention.

Also, it is possible that the molded article such as film and sheet are prepared from the hydrolyzed copolymers according to the invention and then other thermoplastic resins such as polyolefin is extrusion-coated on the molded articles, or the molded articles such as film and sheet are prepared from thermoplastic resins and then the hydrolyzed copolymers according to the invention are laminated on the molded article by using adhesive agents, or the hydrolyzed ethylene-vinyl acetate copolymers obtained by the invention is extrusion-coated on any materials such as papers, metal foils, stretched or non-stretched plastic films or sheets, textiles, non-woven fabrics and woods (and further, other resins such as heat sealant resins are extrusion-coated thereon). In the above-mentioned methods, the hydrolyzed copolymers obtained by the present invention are excellent in adhesive strength to other materials or resins.

After melt-molding, the obtained extrudates, coextrudates, or melt-coated articles may be, if necessary, subjected to an after-treatment such as heat treatment, cooling treatment, rolling treatment, uniaxial stretching, biaxial stretching, printing, dry laminating, solution coating, melt-coating, bag making, deep drawing, box making, tube making, splitting, and the like.

The molded articles obtained from the hydrolyzed ethylene-vinyl acetate copolymers according to the present invention are useful for various uses including parts of various machines and packaging materials.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

EXAMPLE 1

A pressure reactor was charged with 1000 parts of 40% methanol solution of ethylene-vinyl acetate copolymer having an ethylene content of 40% by mole and heated to 110° C. under stirring. Then the hydrolysis reaction was carried out for 2.5 hours by continuously adding 40 parts of 6% methanol solution of sodium hydroxide and 2,500 parts of methanol to the pressure reactor under removing methyl acetate produced as a by-product and excess methanol from the reaction system to give a hydrolyzed ethylene-vinyl acetate copolymer having a degree of hydrolysis in vinyl acetate component of 99.0% by mole.

After completing the hydrolysis, the pressure reactor was charged with 450 parts of mixture of methanol and water (methanol:water=7:3) under distilling away excess methanol, and the methanol solution containing water (methanol:water=7:3) having a resin content of 39% was prepared.

There was mixed 50% aqueous dispersion of ethylene bis stearamide with the obtained solution in a proportion of 0.05 part of ehylene bis stearamide and 100 parts of the hydrolyzed copolymer, and the mixture was thoroughly stirred.

The obtained solution of hydrolyzed ethylene-vinyl acetate copolymer in the mixture of methanol and water having a temperature of 50° C. was extruded through a nozzle (hole diameter: 4 mm) at a rate of 1.5 liters/hour into a coagulating bath of methyl acetate (width: 100 mm, length: 4,000 mm, height: 100 mm) maintained at a temperature of 5° C. in the form of strands. After completing the coagulation, adhereing methyl acetate was removed from the strands with showering water, the strands were passed through a wind-up roller (line speed: 2 m/minute) equipped at the end portion of the coagulating bath, were cut by a cutter to prepare white porous pellets having a diameter of 4 mm and a length of 4 mm.

The coagulating liquid was not quite turbid and the loss of resin was not more than 0.1%. After washing the pellets with water to remove sodium acetate, they were washed with aqueous solution of acetic acid and dried.

The obtained pellets were extruded into a film having a thickness of 30μ under the following conditions.

Extruder: Extruder having a diameter of 40 mm
Screw: L/D=26, Compression ratio=3.5
Die: fish-tail die
Extrusion temperature: Head portion of the cylinder 230° C. Die 210° C.
Screw speed: from 30 to 100 rpm.

The screw torque (A), the volumetric amount of discharge (Qv) and the screw speed (n) were measured and the relationship between A/Qv and the screw speed is shown in FIG. 1 as the curve (1). Also A/Qv, fish eyes and adhesive strength are shown in Table 1.

As shown in FIG. 1, the curve (1) shows that A does not abnormally increase with increasing the revolving screw speed and A/Q decreases since the melted hydrolyzed copolymer in the extruder does not slip.

[Number of fish eyes]

Number of fish eyes indicates the number of fish eyes having a diameter of at least 0.2 mm per area of 10 cm×10 cm of a film (thickness: 30μ) extruded at a screw speed of 60 rpm.

[Adhesive strength]

There is coated 4% ethyl acetate solution of an adhesive agent consisting of urethane film and the coated film is dried at 80° C. for 30 seconds. A film (thickness: 50μ) of a low density polyethylene having a density of 0.924 and a melt index of 1.5 is pressed on the above coated film at 50° C. for 1.0 second under a pressure of 2.0 kg/cm² to laminate. The obtained laminated film is cured at 40° C. for 24 hours and the adhesive strength is measured.

The adhesive strength is measured as follows:
The laminated film is allowed to stand at 20° C. in 65% RH for 7 days, and is cut into test pieces having a width of 15 mm. The adhesive strength is measured by using a Tensilon tensile tester under the following conditions.
  Distance between chucks: 70 mm
  Tension rate: 300 mm/minute
The film according to the invention was peeled off from the polyurethane layer at an angle of 180° C.

EXAMPLE 2

The procedure of Example 1 was repeated except that a mixture of methanol and water (methanol:water=1:9) was employed instead of methyl acetate as the coagulating liquid.

The relationship between A/Qv and the screw speed is shown in FIG. 1 as the curve (2). Also the results are shown in Table 1.

As shown in FIG. 1, the curve (2) shows that A does not abnormally increase with increasing the revolving screw speed and A/Q decreases since the melted hydrolyzed copolymer in the extruder does not slip.

COMPARATIVE EXAMPLE 1

The procedure of Example 1 was repeated except that ethylene bis stearamide was not employed.

The relationship between A/Qv and the screw speed is shown in FIG. 1 as the curve (3). Also, the results are shown in Table 1.

As shown in FIG. 1, the curve (3) shows that A abnormally increases with increasing the screw speed, thus resulting in the increase of A/Qv.

COMPARATIVE EXAMPLE 2

There was dry-blended 100 parts of the same hydrolyzed ethylene-vinyl acetate copolymer as used in Example 1 with 0.05 part of ethylene bis stearamide, the mixture was pelletized at 230° C. by an extruder, and molding of the obtained pellets was carried out in the same manner as in Example 1.

The relationship between A/Qv and the screw speed is shown in FIG. 1, as the curve (4). Also, the results are shown in Table 1.

As shown in the curve (4) of FIG. 1, the melted hydrolyzed copolymer in the extruder slips with increasing the revolving screw speed since the lubricant is ununiformly mixed with the hydrolyzed copolymer. Therefore, since Qv does not proportionally increase, A/Qv is increased.

EXAMPLE 3

The procedure of Example 1 was repeated except that a hydrolyzed ethylene-vinyl acetate copolymer having an ethylene content of 31% by mole and a degree of hydrolysis of 99.2% by mole was employed as the hydrolyzed copolymer.

The results are shown in Table 1.

EXAMPLES 4 and 5

The procedure of Example 1 was repeated except that 0.10 part of calcium stearate (Example 4) or 0.1 part of a polyethylene having a low molecular weight (melt viscosity at 140° C.: 1 poise, softening point: 108° C.) (Example 5) was employed instead of 0.05 part of ethylene bis stearamide.

The results are shown in Table 1.

EXAMPLE 6

The procedure of Example 1 was repeated except that the methanol solution of the hydrolyzed ethylene-vinyl acetate copolymer was employed instead of the methanol solution containing water.

The results are shown in Table 1.

In the present invention, the pellets having excellent effects can be prepared from the solutions of the hydrolyzed ethylene-vinyl acetate copolymers in methanol or the mixture of water and methanol, the solutions including the lubricants. That is, the pellets obtained by the process of the invention are excellent in melt-moldability, and in the molded articles prepared from the pellets, properties do not lower, fish eyes are scarcely formed and the adhesive strength to other plastic films or sheets is excellent.

TABLE 1

|  | A/Qv(liter/hour) | | | | Number of fish eye (number/100 cm²) | Adhesive strength (g/15 mm) |
| --- | --- | --- | --- | --- | --- | --- |
|  | 40 rpm | 60 rpm | 80 rpm | 100 rpm | | |
| Ex. 1 | 0.81 | 0.55 | 0.43 | 0.42 | from 0 to 1 | 1,033 |
| Ex. 2 | 0.85 | 0.58 | 0.47 | 0.45 | from 1 to 2 | 1,020 |
| Ex. 3 | 0.80 | — | — | 0.40 | from 0 to 1 | 1,010 |
| Ex. 4 | 0.84 | — | — | 0.39 | from 1 to 2 | 1,005 |
| Ex. 5 | 0.86 | — | — | 0.41 | from 0 to 1 | 1,000 |
| Ex. 6 | 0.82 | — | — | 0.43 | from 0 to 1 | 1,030 |
| Com. Ex. 1 | 1.13 | 0.96 | 0.95 | 1.08 | from 25 to 30 | 1,045 |
| Com. Ex. 2 | 1.06 | 0.87 | 0.83 | 0.87 | from 10 to 15 | 680 |

EXAMPLE 7

The pellets were produced in the same manner as in Example 1.

There was mixed 100 parts of the pellets with 500 parts of water to prepare a slurry, to which 10 parts of 5% aqueous solution of acetic acid and 18 parts of 1% aqueous solution of calcium primary phosphate were added, and the mixture was stirred at 30° C. for 4 hours. The resultant was filtered and dried.

The thus obtained hydrolyzed ethylene-vinyl acetate copolymer had a sodium content of 0.011%, a molar ratio of sodium to phosphate ion of 2.5 and a molar ratio of caldium to the phosphate ion of 0.61.

The injection molding was carried out by using the hydrolyzed copolymer under the following conditions.

Cylinder temperature at rear part: 180° C.
Cylinder temperature at front part: 230° C.
Nozzle temperature: 210° C.
Metal mold temperature: 60° C.
Injection pressure: 900 kg/cm$^2$
Injection rate: 2.5 ml/mm$^2$/second
Injection time: 7 seconds
Cooling time: 25 seconds The coloration of each of disks (diameter: 60 mm, thickness: 3 mm) obtained at the first shot and the 10th shot was measured by using spectro colorimeter (Nippon Denshoku Kogyo Kabushiki Kaisha SZ-Σ80) and the thermal stability was estimated according to JIS K 7103.

Also the pellets were extruded at 230° C. to give a film having a thickness of 30μ. The number of fish eyes formed on the film (the number per an area of 100 cm$^2$) was counted. Further, the hydrolyzed copolymer was pelletized three times at 230° C. by using the extruder and the obtained pellets received the thermal history in long time were extruded in the same manner as above to give a film. The number of fish eyes formed on the film was counted.

The results are shown in Table 2.

EXAMPLES 8 to 20

The acid treatment was carried out according to Example 7 under the conditons shown in Table 2. The results are shown in Table 2.

In Table 2, the amounts of phosphate ion, sodium, calcium and magnesium were respectively determined as follows:

The acids and salts were extracted from the sample with warm diluted sulfuric acid. With respect to the extract, the amount of phosphate ion was determined according to JIS K 0102 by absorption spectrometry (using molybdenum blue) and the amount of sodium was determined by flame emission spectrometry.

The amount of calcium and magnesium were determined by suppling the sample to a crucible, adding sulfuric acid, reducing to ash, dissolving the obtained ash in diluted hydrochloric acid and determining by atomic absorption spectrometry.

TABLE 2

| | EVOH*1 | | Acid (a)*2 | |
|---|---|---|---|---|
| | Ethylene content (% by mole) | Degree of hydrolysis (% by mole) | Kind | Amount (part) |
| Ex. 7 | 30 | 99.0 | Acetic acid | 0.5 |
| Ex. 8 | 30 | 99.0 | Acetic acid | 0.5 |
| | | | Sodium primary phosphate | 0.1 |
| Ex. 9 | 30 | 99.0 | Acetic acid | 0.1 |
| | | | Orthophophoric acid | 0.1 |
| Ex. 10 | 30 | 99.0 | Acetic acid | 0.7 |
| | | | Orthophophoric acid | 0.1 |
| Ex. 11 | 38 | 99.1 | Acetic acid | 0.7 |
| | | | Orthophophoric acid | 0.08 |
| Ex. 12 | 30 | 99.0 | Acetic acid | 0.17 |
| | | | Orthophophoric acid | 0.05 |
| Ex. 13 | 30 | 99.0 | Acetic acid | 0.26 |
| | | | Lactic acid | 0.08 |
| Ex. 14 | 30 | 99.0 | Acetic acid | 0.26 |
| | | | Glycolic acid | 0.06 |
| Ex. 15 | 30 | 99.0 | Acetic acid | 0.17 |
| | | | Maloic acid | 0.05 |
| Ex. 16 | 30 | 99.0 | Acetic acid | 0.17 |
| | | | Maleic acid | 0.06 |
| Ex. 17 | 30 | 99.0 | Acetic acid | 0.17 |
| | | | Orthophophoric acid | 0.08 |
| Ex. 18 | 30 | 99.0 | Acetic acid | 0.17 |
| | | | Orthophophoric acid | 0.08 |
| Ex. 19 | 30 | 99.0 | Acetic acid | 0.06 |
| | | | Orthophophoric acid | 0.07 |
| Ex. 20 | 30 | 99.0 | Acetic acid | 0.26 |
| | | | Orthophosphoric acid | 0.07 |

| Salt (b)*2 | | Content of sodium (% by weight) | Na/PO$_4$ (molar ratio) |
|---|---|---|---|
| Kind | Amount (part) | | |

TABLE 2-continued

|        | Primary salt (b)*²         | Amount (part) | Content of sodium (%) | Na/PO₄ (molar ratio) |
|--------|----------------------------|---------------|-----------------------|----------------------|
| Ex. 7  | Calcium primary phosphate  | 0.18          | 0.011                 | 2.5                  |
| Ex. 8  | Calcium primary phosphate  | 0.18          | 0.014                 | 1.9                  |
| Ex. 9  | Calcium primary phosphate  | 0.12          | 0.024                 | 3.3                  |
| Ex. 10 | Calcium primary phosphate  | 0.18          | 0.025                 | 1.2                  |
| Ex. 11 | Calcium primary phosphate  | 0.12          | 0.021                 | 2.4                  |
| Ex. 12 | Magnesium primary phosphate| 0.11          | 0.017                 | 4.5                  |
| Ex. 13 | Calcium primary phosphate  | 0.12          | 0.011                 | 2.1                  |
| Ex. 14 | Calcium primary phosphate  | 0.12          | 0.012                 | 1.8                  |
| Ex. 15 | Calcium primary phosphate  | 0.18          | 0.018                 | 3.8                  |
| Ex. 16 | Calcium primary phosphate  | 0.18          | 0.019                 | 3.7                  |
| Ex. 17 | Calcium primary citrate    | 0.35          | 0.009                 | 4.9                  |
| Ex. 18 | Calcium primary tartrate   | 0.29          | 0.010                 | 4.4                  |
| Ex. 19 | Calcium primary malonate   | 0.13          | 0.008                 | 3.4                  |
| Ex. 20 | Calcium primary maleate    | 0.14          | 0.008                 | 3.7                  |

|        | Ca/PO₄ or Mg/PO₄ (molar ratio) | Coloration The first shot | Coloration The 10th shot | Number of fish eyes Once pelletized | Number of fish eyes Three times pelletized |
|--------|--------------------------------|---------------------------|--------------------------|-------------------------------------|--------------------------------------------|
| Ex. 7  | 0.61 | 8 | 9  | from 0 to 1 | from 0 to 2 |
| Ex. 8  | 0.43 | 5 | 7  | from 0 to 1 | from 0 to 2 |
| Ex. 9  | 0.34 | 7 | 8  | from 0 to 1 | from 0 to 2 |
| Ex. 10 | 0.43 | 5 | 6  | from 0 to 1 | from 0 to 2 |
| Ex. 11 | 0.39 | 7 | 8  | from 0 to 1 | from 0 to 2 |
| Ex. 12 | 0.44 | 7 | 9  | from 0 to 1 | from 0 to 2 |
| Ex. 13 | 0.67 | 8 | 10 | from 0 to 1 | from 0 to 2 |
| Ex. 14 | 0.17 | 9 | 10 | from 0 to 1 | from 0 to 2 |
| Ex. 15 | 0.67 | 7 | 8  | from 0 to 1 | from 0 to 2 |
| Ex. 16 | 0.60 | 8 | 10 | from 0 to 1 | from 0 to 2 |
| Ex. 17 | 1.2  | 9 | 10 | from 0 to 1 | from 0 to 2 |
| Ex. 18 | 1.3  | 8 | 10 | from 0 to 1 | from 0 to 2 |
| Ex. 19 | 1.0  | 8 | 10 | from 0 to 1 | from 0 to 2 |
| Ex. 20 | 1.0  | 8 | 10 | from 0 to 1 | from 0 to 2 |

Notes:
EVOH*¹: Hydrolyzed ethylene-vinyl acetate copolymer
Acid (a)*²: Acid having a pka of not less than 5.0
Primary salt (b)*²: Primary salt of polybasic acid having a pka of not more than 3.4

What we claim is:

1. A process for preparing improved pellets of a hydrolyzed ethylene-vinyl acetate copolymer which comprises extruding a methanol or a water-methanol solution including a hydrolyzed ethylene-vinyl acetate copolymer and 0.01 to 0.5 part by weight, based on 100 parts by weight of said copolymer, of a lubricant into a coagulating liquid in the form of a strand and cutting said strand into pellets; said lubricant being a member selected from the group consisting of a saturated fatty acid amide, an unsaturated fatty acid amide, a bis-fatty acid amide, a metal salt of fatty acid and a polyolefin having a low molecular weight.

2. The process of claim 1, wherein said pellets are treated with (a) an acid containing an acid group having a pka of not more than 5.0 at 25° C. and (b) a primary calcium or magnesium salt of a polybasic acid containing an acid group having a pka of not more than 3.4 at 25° C., at least one of said acid (a) and said primary salt of polybasic acid (b) having phosphate ion, so that the treated hydrolyzed ethylene-vinyl acetate copolymer has (1) a content of alkali metals of 0.001 to 0.025% by weight, (2) a molar ratio of the alkali metals to phosphate ion of 0.1 to 5 and (3) a molar ratio of calcium or magnesium to phosphate ion of 0.3 to 1.3.

3. The process of claim 1, wherein the surface of said pellets is covered with a lubricant by spraying an aqueous dispersion of the lubricant to the hydrolyzed ethylene-vinyl acetate copolymer pellets.

4. The process of claim 1, wherein the surface of said pellets is covered with a lubricant by dipping the pellets of the hydrolyzed ethylene-vinyl acetate copolymer into an aqueous dispersion of the lubricant and drying.

5. The process of claim 1, wherein the hydrolyzed ethylene-vinyl acetate copolymer has an ethylene content of 20 to 60% by mole and a degree of hydrolysis in the vinyl acetate of not less than 90% by mole.

6. The process of claim 5, wherein said hydrolyzed ethylene-vinyl acetate copolymer further contains 0.1 to 10% by mole of a copolymerizable comonomer.

7. The process of claim 1, wherein the concentration of hydrolyzed ethylene-vinyl acetate copolymer in the solution is from 10 to 50% by weight.

8. The process of claim 7, wherein the weight ratio of water and methanol in the solution is from 1:9 to 7:3.

9. The process of claim 1, wherein the coagulating liquid comprises water or a mixture of methanol and water, the methanol concentration in the mixture being from 10 to 50% by weight.

10. The process of claim 1, wherein the coagulating liquid comprises an organic solvent having a boiling point of not more than 100° C. and being compatible with methanol but not being capable of dissolving the hydrolyzed copolymer.

11. The process of claim 10, wherein the organic solvent is a material selected from the group consisting of an aromatic hydrocarbon, a ketone, an ether, and an organic acid ester.

12. The process of claim 11, wherein the organic solvent is methyl acetate.

13. The process of claim 1, wherein the solution is extruded into the coagulating liquid at a temperature of −10 to 40° C.

* * * * *